United States Patent
Tao et al.

(10) Patent No.: US 8,023,462 B2
(45) Date of Patent: Sep. 20, 2011

(54) GRAPH-BASED METHOD FOR DYNAMIC FRACTIONAL FREQUENCY REUSE

(75) Inventors: Zhifeng Tao, Allston, MA (US);
Yu-Jung Chang, Los Angeles, CA (US);
Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 587 days.

(21) Appl. No.: 12/205,554

(22) Filed: Sep. 5, 2008

(65) Prior Publication Data
US 2010/0061469 A1 Mar. 11, 2010

(51) Int. Cl.
*H04W 4/00* (2009.01)
(52) U.S. Cl. ........................ 370/329; 370/254
(58) Field of Classification Search .......... 370/329, 370/254, 255, 330, 344, 328
See application file for complete search history.

(56) References Cited

U.S. PATENT DOCUMENTS

| | | | |
|---|---|---|---|
| 2004/0014472 A1* | 1/2004 | de La Chapelle et al. | .... 455/429 |
| 2009/0081955 A1* | 3/2009 | Necker | ........ 455/63.1 |
| 2009/0109868 A1* | 4/2009 | Chen et al. | ...... 370/254 |
| 2009/0124265 A1* | 5/2009 | Black et al. | ....... 455/456.1 |
| 2009/0156223 A1* | 6/2009 | Krishnaswamy et al. | .... 455/446 |

OTHER PUBLICATIONS

Brelaz, D. et al. "New Methods to Color the Vertices of a Graph." Comm. ACM 22, pp. 251-256, 1979.

* cited by examiner

*Primary Examiner* — Brian Nguyen
(74) *Attorney, Agent, or Firm* — Dirk Brinkman; Gene Vinokur (57) ABSTRACT

A method allocates frequency subchannels in an orthogonal frequency-division multiple access (OFDMA) network including a set of base stations and a set of mobile stations for each base station. A graph of nodes and edges is constructed, in which the nodes represent the mobile stations in the network, and the edges connecting the nodes represent subchannel allocation constraints to be satisfied for the mobile stations represented by the nodes. The nodes are colored with colors selected from a set of colors such that subchannel allocation constraints of a pair of nodes connected by one of the edges are satisfied. The subchannels are allocated to the mobile stations according to the colors of the corresponding the nodes.

7 Claims, 10 Drawing Sheets

GRAPH-BASED METHOD FOR DYNAMIC FRACTIONAL FREQUENCY REUSE

FIELD OF THE INVENTION

This invention relates generally to allocating frequency bandwidths in wireless networks, and more particularly to allocating subchannels in orthogonal frequency division multiple access (OFDMA) wireless networks.

BACKGROUND OF THE INVENTION

OFDMA

Orthogonal frequency-division multiplexing (OFDM) is a modulation technique used at the physical layer (PHY) of a number of wireless networks, e.g., networks designed according to the IEEE 802.11a/g and IEEE 802.16/16e standards. Orthogonal frequency division multiple access (OFDMA) is a multiple access scheme based on OFDM. In OFDMA, separate sets of orthogonal tones (subchannels) and time slots are allocated to multiple transceivers or mobile stations (MS) so that the transceivers can communicate concurrently. OFDMA is widely adopted in many next generation cellular networks, such as 3GPP long term evolution (LTE) and, the IEEE 802.16m standard due to its effectiveness and flexibility in radio resource allocation.

OFDMA Frequency Allocation

The radio spectrum is a scarce resource in wireless communications, and therefore an efficient use is needed. The rapid growth of wireless applications and the mobile stations require a good radio resource management (RRM) scheme that can increase the network capacity, and reduce deployment cost. Consequently, there is a need to develop an effective radio frequency allocation scheme for OFDMA.

The fundamental challenge in frequency allocation is the inequality between the size of the spectrum, the large number of mobile stations, and the large geographical areas that need to be covered. In other words, the same frequency spectrum should be reused in multiple cells. This will inevitably incur inter-cell interference (ICI), when mobile stations in adjacent cells use the same spectrum. In fact, ICI has been shown to be the predominant performance-limiting factor for wireless cellular networks. As a result, a significant amount of research has been devoted to developing ICI-aware radio resource allocation for cellular networks.

Fractional Frequency Reuse

Several ICI-aware frequency allocation schemes are known for the next generation OFDMA networks. Fractional frequency reuse, (FFR) is one technique supported in WiMAX.

Figure 1A:
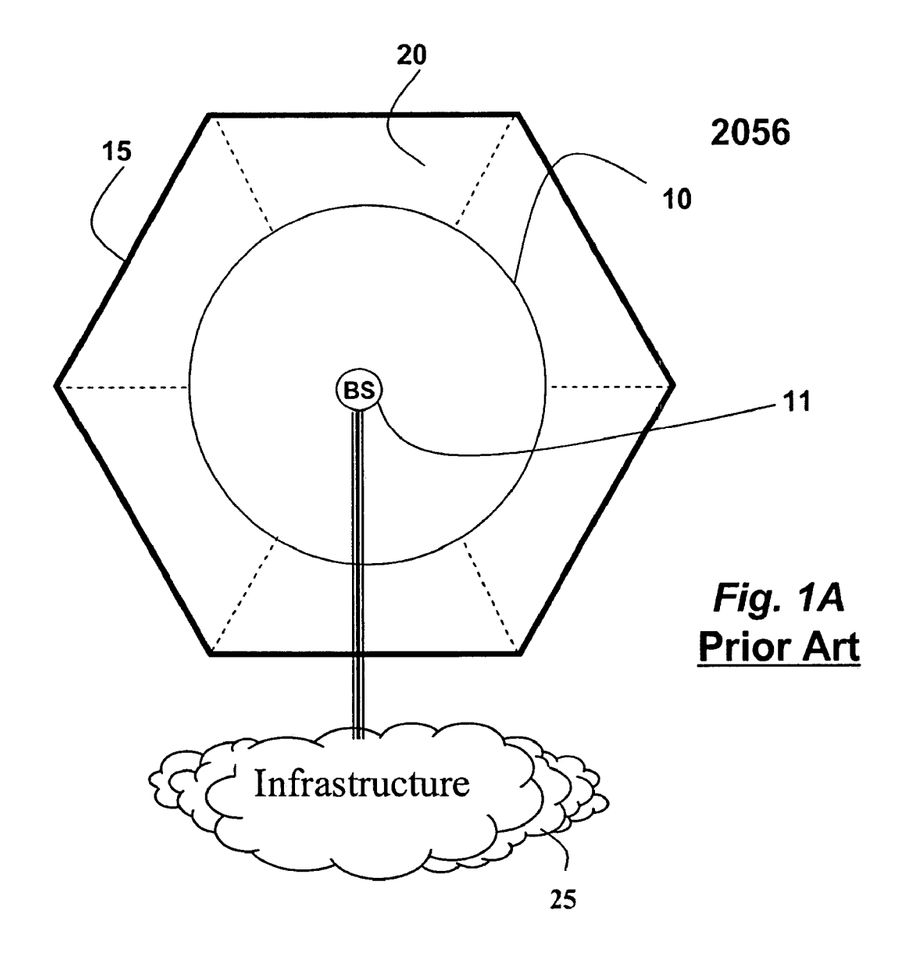
FIG. 1A is a schematic of a conventional cell in an OFDMA network.

As shown conventionally in FIG. 1A, FFR partitions a cell 15, shown approximately as a hexagon, into a cell center 10 around a base station (BS) 11 and cell edge regions 20. The cell center of adjacent cells can use the same overlapping spectrum, while the cell edge regions of adjacent cells should use non-overlapping spectra. This is designed with the goal of striking a better trade-off between spectral efficiency and interference mitigation by leveraging the fact that cell-edge mobile stations are more ICI-prone than cell-center mobile stations. Typically, the base station 11 and other base stations communicate with each other via an infrastructure 25 or 'backbone' of the network.

There are many possible realizations of the FFR concept in terms of bandwidth partitioning and definition of cell center and cell edge. Most of these schemes, however, are of a fixed configuration. That is, their bandwidth allocation for cell center and cell edge is predetermined and not adaptive to dynamic traffic variations. This is not efficient when traffic changes over time and/or the number of mobile stations is asymmetric among a group of cells.

Graph-Based Framework in Prior Channel Allocation

The channel allocation problem in conventional (non-OFDMA) cellular and mesh networks has been solved using a graph coloring approach. In the conventional problem formulation, each node in the graph corresponds to a base station (BS) or an access point (AP) in the network to which subchannels are allocated. The edge connecting two nodes represents the co-channel interference, which typically corresponds to the geographical proximity of the BSs. Then, the allocation problem subject to the interference constraints becomes a node coloring problem, wherein two interfering nodes should not have the same color.

Other graph based methods are described in U.S. patent application Ser. No. 12/112,346, "Graph-Based Method for Allocating Resources in OFDMA Networks," filed by Tao et al., on Mar. 30, 2008, and U.S. patent application Ser. No. 12/112,400, "Graph-Based Method for Allocating Resources in OFDMA Networks," filed by Tao et al., on Mar. 30, 2008. The first Application ('346) constructs a graph and then partitions the graph into non-overlapping clusters of nodes to minimize interference. The second Application ('400) constructs a graph using diversity sets maintained at base stations, and then allocating channel resources to the mobile stations based on the structure of the graph, the potential interference between the stations, and the channel quality.

SUMMARY OF THE INVENTION

The embodiments of the invention provide a method for allocating frequency resources for communications between base stations (BS) and mobile stations (MS) in multi-cell OFDMA networks using a graph-based approach. The graph-based approach differs from the prior art in two fundamental aspects.

First, the prior art method based on graph intends to minimize the number of color in use in a successful coloring of the entire graph. In the graph according to the invention, the number of colors (subchannels) is a fixed and predetermined resource. Thus, when exhaustive coloring of the graph is not feasible, some nodes (MS) are compromised with no coloring, or equivalently, suspended from service.

Second, nodes in the graph denote mobile stations rather than base stations, because it is mobile stations, not base stations, to which channel resources are allocated in OFDMA networks.

In the prior art graph, the base stations represented by the nodes in the graph are stationary, thus mobility of the stations is not an issue, and the problem is relatively simple to solve. In the present method, the location and movement of the mobile stations change the interference dynamics, consequently the graph and the channel resource allocation.

The method includes two typical steps in the graph coloring approach:

graph construction; and graph coloring.

In the first step, a graph is constructed, which corresponds to the topology of mobile stations as; well as the bandwidth allocation constraints laid out by fractional frequency reuse (FFR). The graph can be constructed by a centralized entity, e.g., a designated base station, or an infrastructure of the network.

In the second step, the constructed graph is colored using a coloring method, so that no two nodes, connected by the same edge, have the same color, i.e., the same subchannel allocation. After the appropriate subchannels have been determined, the information can be distributed to the base stations, and from the base stations to the mobile stations. The updating of the graph can be done dynamically as needed, as channel conditions change, and the locations of the mobile stations change over time.

DETAILED DESCRIPTION OF THE PREFERRED EMBODIMENT

Graph-based OFDMA Frequency Allocation

Figure 1B:
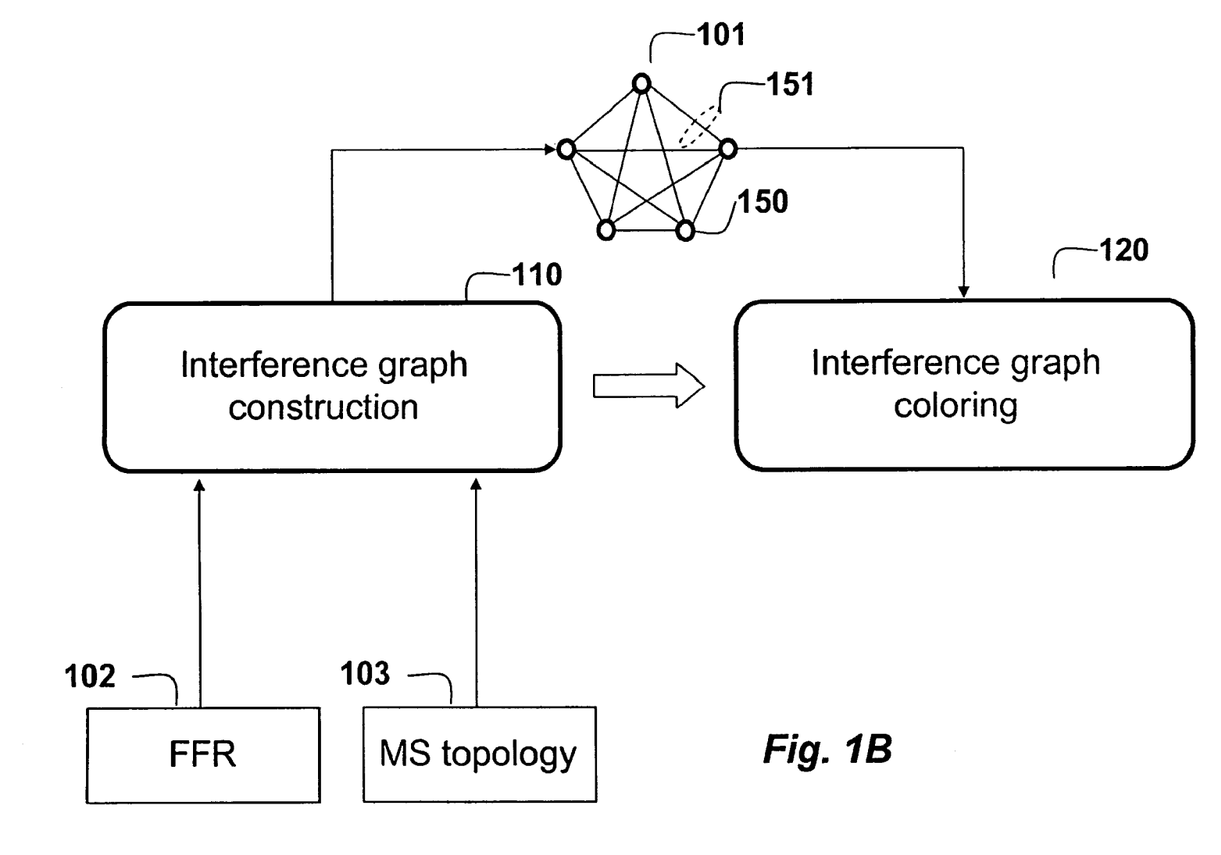
FIG. 1B is a flow chart of a method for allocating subchannels in an orthogonal frequency-division multiple access (OFDMA) network according to embodiments of the invention.

FIG. 1B shows a method for allocating frequency bandwidths, i.e., subchannels, for downlinks from base stations to mobile stations in an orthogonal frequency-division multiple access (OFDMA) network according to embodiments of our invention. The OFDMA network includes a set of base stations (BS), and a set of mobile stations (MS) for each base station.

We construct 110 a graph 101 to model the OFDMA network. In the graph, nodes 150 represent the mobile stations. Edges 151 connecting pairs of nodes represent subchannel allocation constraints of the mobile stations.

The graph is constructed with proper connection of edges, which takes into account a specific fractional frequency reuse (FFR) scheme 102, and a topology 103 of the network. The topology takes into account the location of the base station, e.g., whether the base stations are adjacent or not, and the locations of the mobile stations, e.g., whether MSs of adjacent BSs are at cell edges or not.

The graph is then colored 120. Coloring assigns a color to each node such that two nodes connected by the same edge use different colors. Subchannels are allocated to the mobile stations according to the colors of the corresponding nodes.

Spectrum Allocation

Figure 2A:
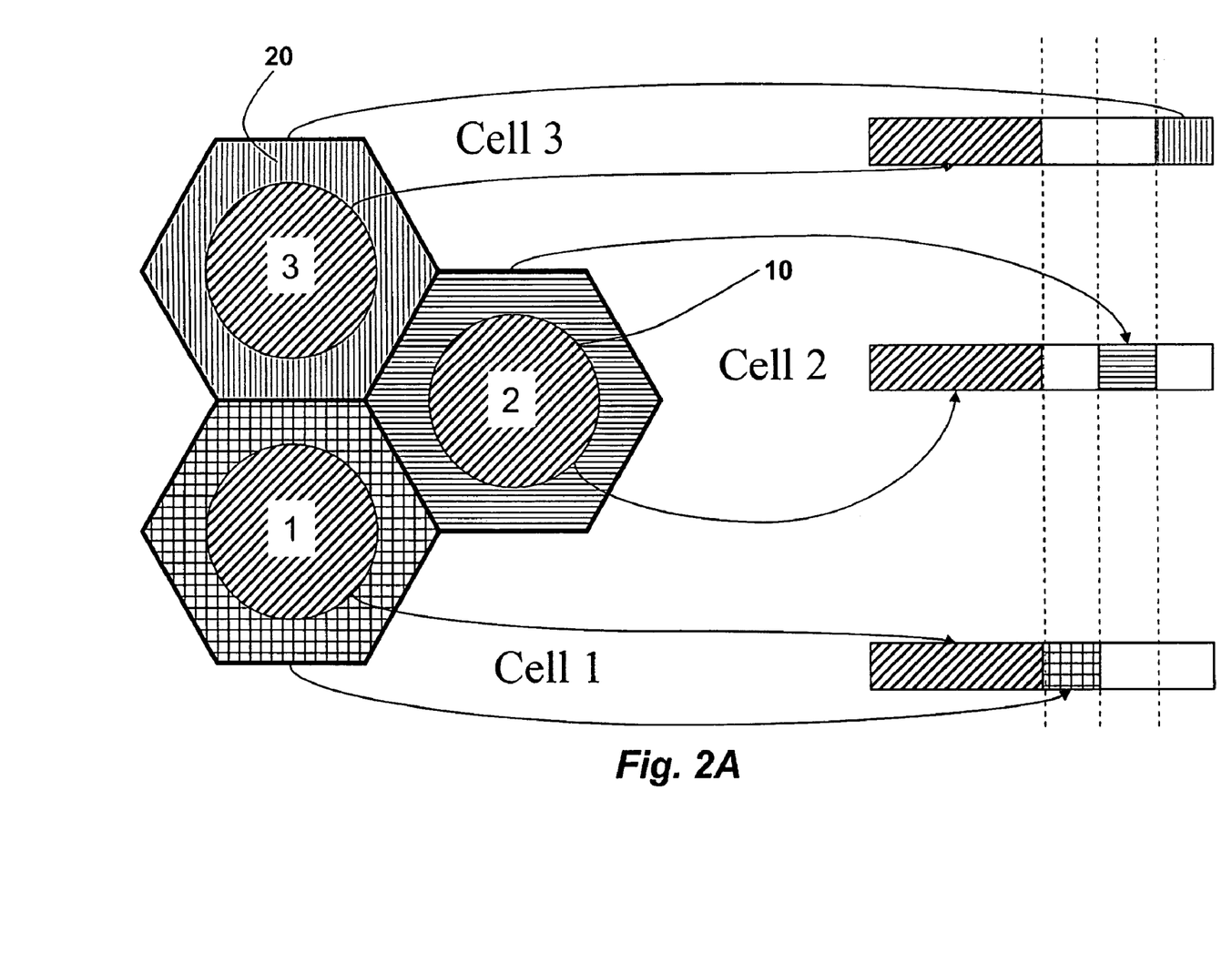
FIGS. 2A-2B are schematics of spectrum allocation implemented in neighboring cells for a fractional frequency reuse scheme according to embodiments of the invention.
Figure 2B:
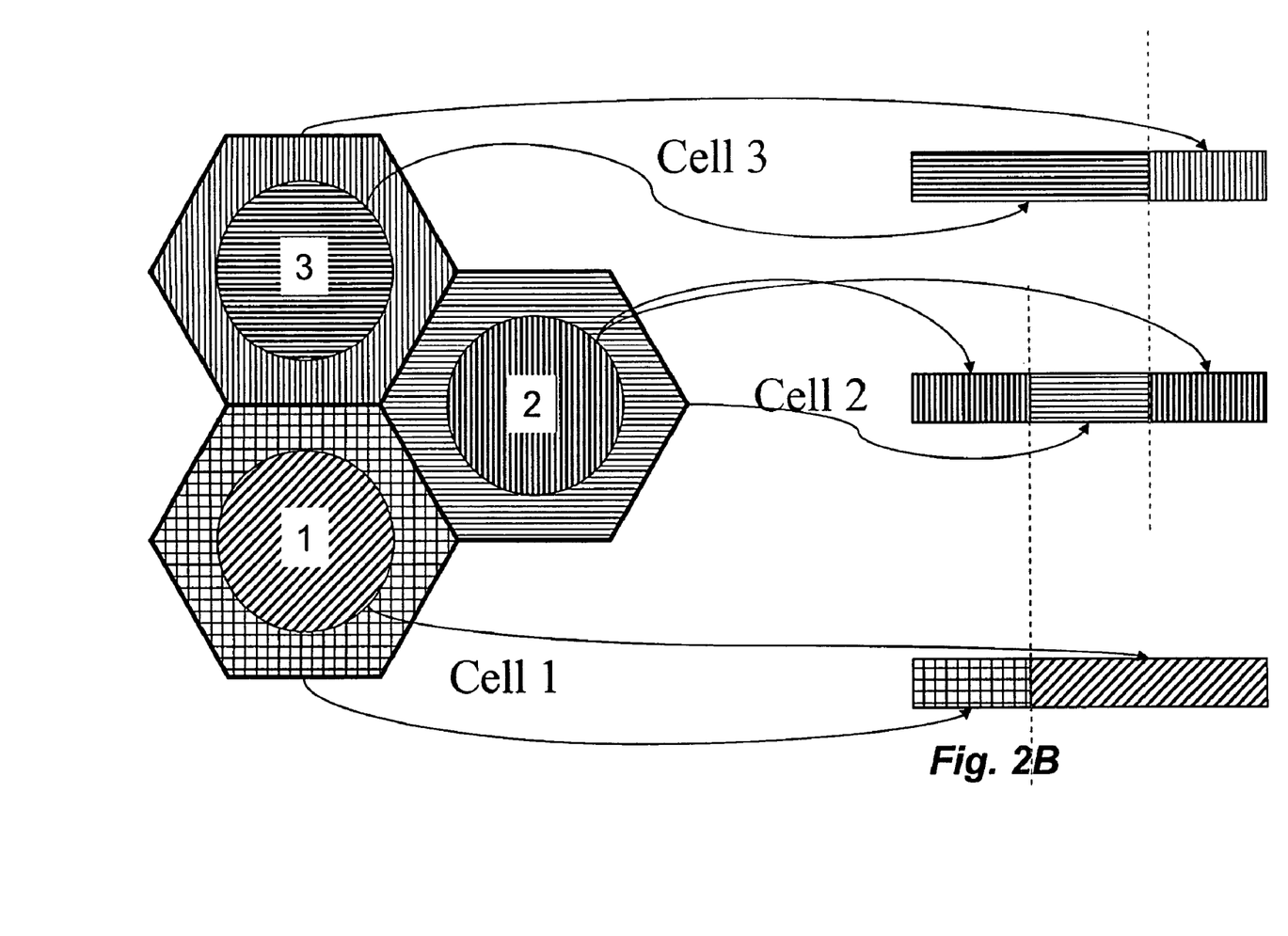

FIGS. 2A-2B show spectrum allocations for OFDMA multi-cell networks according to the FFR cell planning principles. Two versions of FFR, namely a first FFR-A, and a second FFR-B, are shown in FIG. 2A and FIG. 2B, respectively. Three cells are shown, but the idea can be generalized to more cells. Each cell is geographically partitioned into a cell-center region 10, and a cell-edge region 20. Each cell uses a portion of the entire network bandwidth.

FIG. 2A shows the first FFR-A scheme. With FFR-A, the mobile stations in the cell center regions of adjacent cells share the same bandwidth, i.e., they are allocated the same subchannels, while mobile stations in cell edge regions of different cell are allocated different subchannels. The white colored bandwidth in FIG. 2A is not used in order to satisfy cell-edge subchannel allocation constraints. The vertical dashed lines indicate the separation of the subchannels.

FIG. 2B shows the second FFR-B scheme. With FFR-B, different than FFR-A, partial overlapping between subchannels of mobile stations in cell center regions and cell edge regions in adjacent cells is permitted. This gives FFR-B the advantage of a higher spectral efficiency, as there is no unused 'white colored' bandwidth. However, the FFR-B scheme is more likely to cause interference between mobile stations in cell-centers and mobile stations in cell-edges of adjacent cells.

An Example Network

Figure 3:
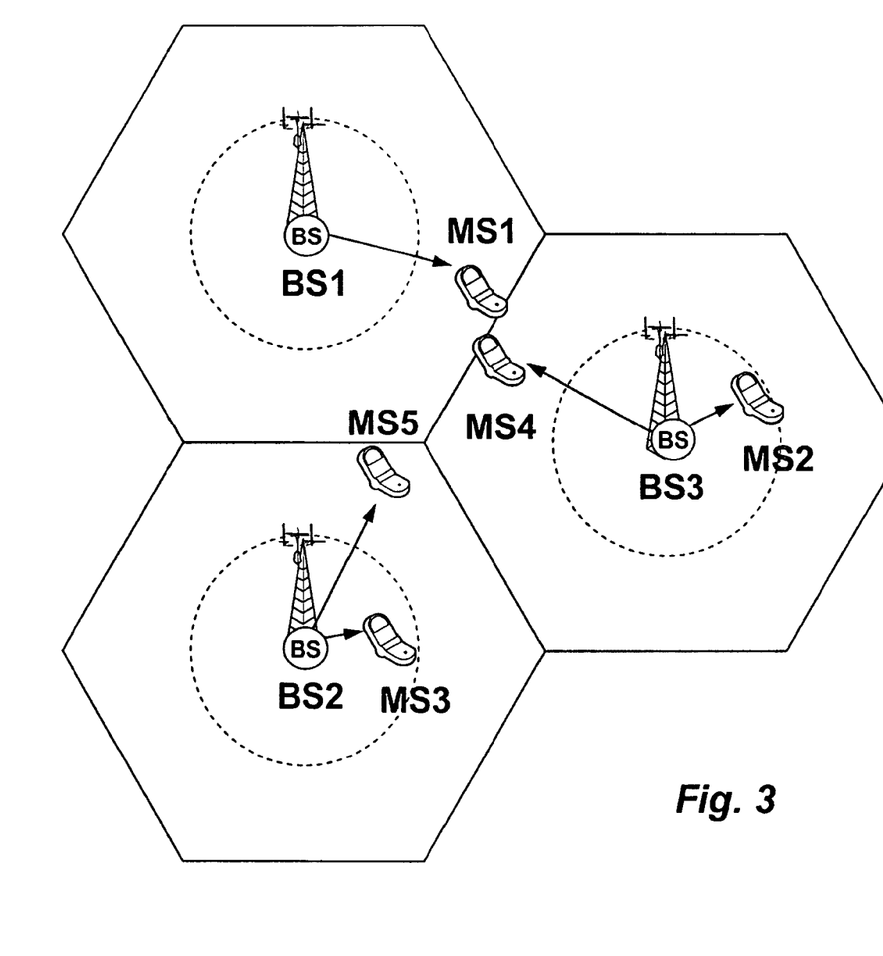
FIG. 3 is a schematic of a multi-cell network according to embodiments of the invention.

FIG. 3 shows an example arrangement of base stations (BS1, BS2, BS3) and mobile stations (MS1, MS2, MS3, MS4, MS5). We want to determine the subchannel allocation for the downlinks from the geographic locations of the mobile stations. We use this information to construct the corresponding graph 101 as shown in greater detail in FIGS. 5 and 7.

Construction of Graph

The first step to the graph-based approach is to construct 110 the graph 101 corresponding to the topology 103 of the MSs. Each MS is represented by a node in the graph. Whether two nodes are connected by an edge is determined by whether two mobile stations can potentially interfere with each other according to the FFR principle, i.e., subchannel allocation constraints. That is, the mobile stations interfere when they use the same subchannels. FFR-A and FFR-B schemes have different subchannel considerations, which leads to different edge constructions, and consequently to different graphs.

Figure 4:
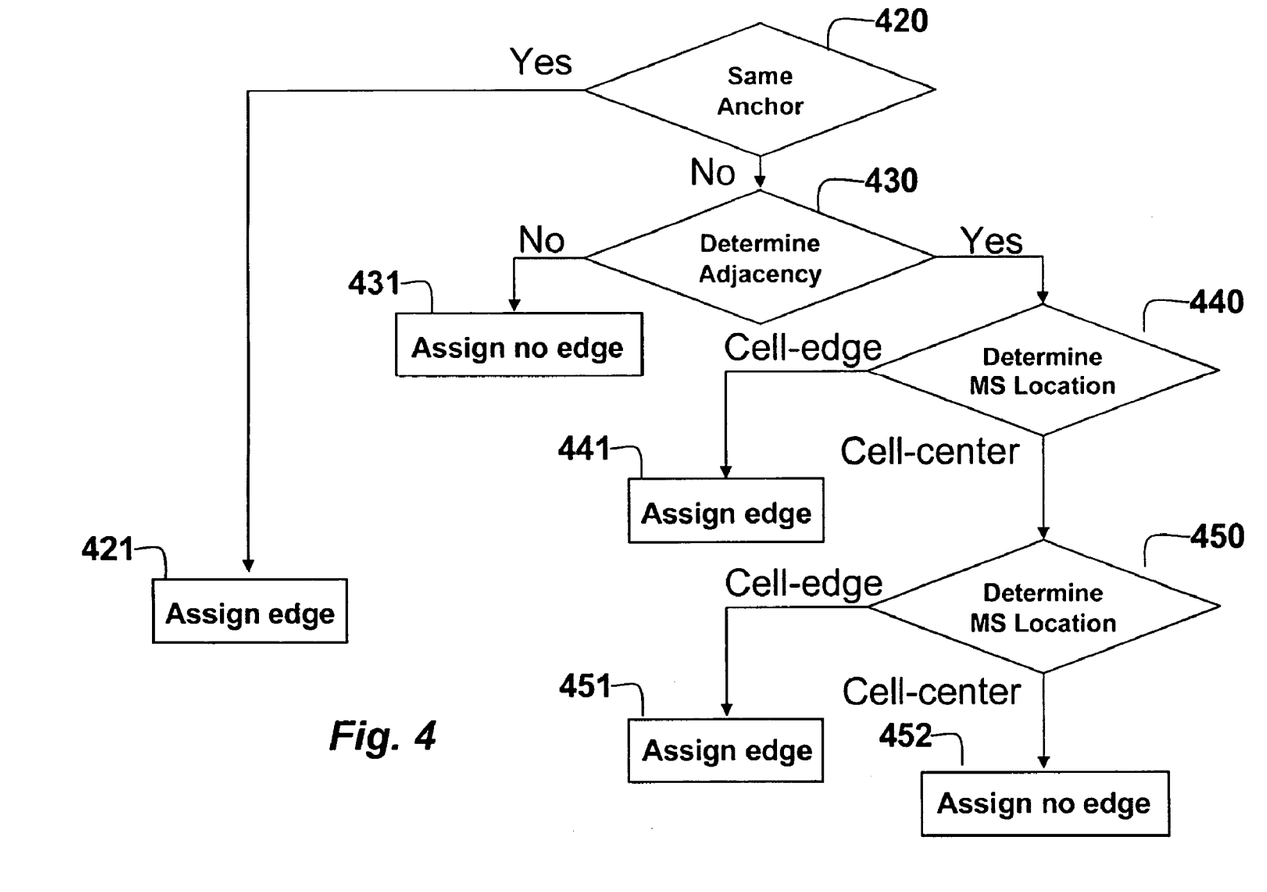
FIGS. 4 and 6 are flow charts of methods for determining a graph according to an embodiment of the invention.

FIG. 4 shows the method to determine the edge between two nodes a and b, for FFR-A.

First, the anchor BSs of MS a and MS b are checked 420. The anchor base station is the access point that first allocates resources to a mobile station when the station enters the network. If the anchor BSs are the same, then the edge decision can be made directly, i.e., nodes a and b are connected by an edge 421. It is presumed that the BS, which controls communication with both MSs, ensures that the MSs do not interfere, i.e., use the same subchannels at the same time. Thus, the subchannel allocation constraint is satisfied by the common base station in the case the two mobile station have the same base station.

If the base stations are not the same, then further processing is needed, and there may be other subchannel allocation constraints. Specifically, we determine 430 whether the anchor BS of MS a is adjacent to the anchor BS of MS b. If this is not the case, then there is no edge between nodes a and b 431, i.e., there are no subchannel allocation constraints to be satisfied. That is, it is unlikely that the MSs of one base station will interfere with the MSs of the non-adjacent base station.

If the base stations are adjacent, then the location of MS a is examined 440 to determine if MS a is at the cell center or at the cell edge. If MS a is at the cell edge, then assign an edge 441 between nodes representing the mobile stations a and b, i.e., there may be subchannel allocation constraints to be satisfied. If MS a is at the cell center, then MS b is further examined 450 to determine if MS b is at the cell center or at the cell edge. If MS b is at the cell edge, then assign edge 451, i.e., there may be subchannel allocation constraints to be satisfied. Otherwise, assign no edge 452 between nodes a and b, i.e., there are no subchannel allocation constraints to be satisfied.

Figure 5:
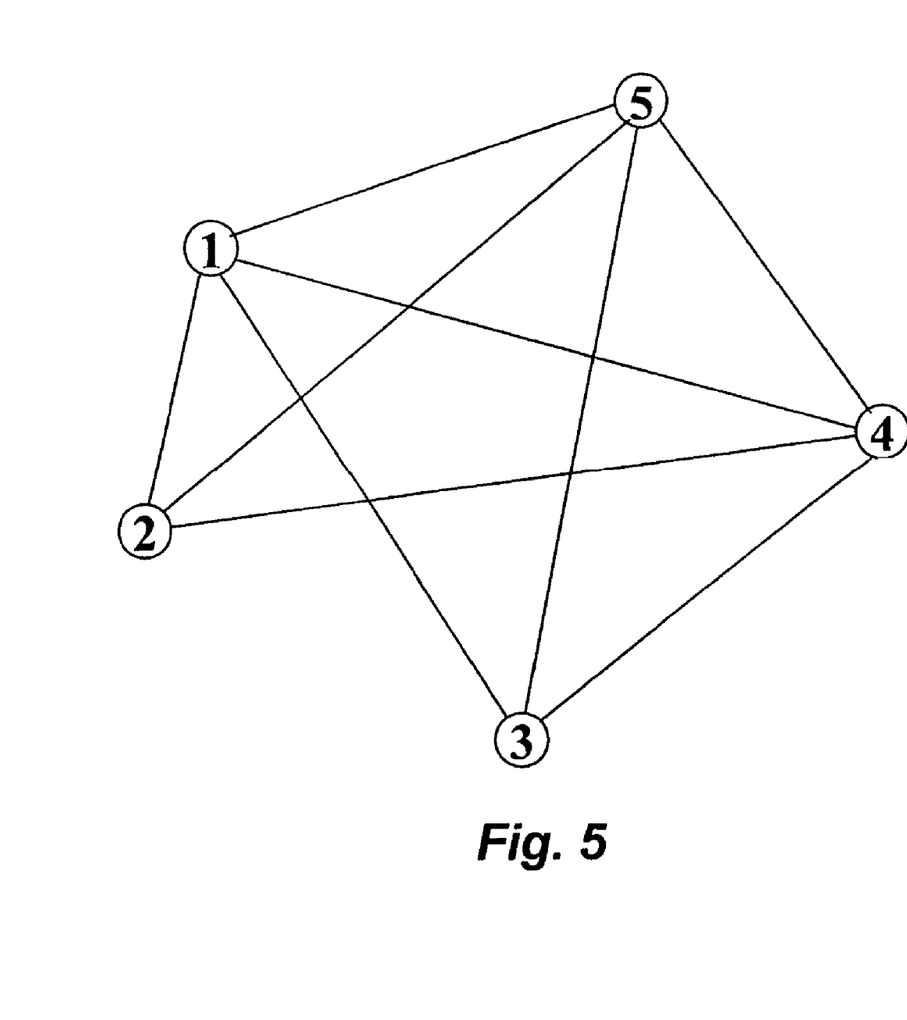
FIGS. 5 and 7 are procedures to create a graph based on given network topology according to embodiments of the invention.

The resulting graph is shown in FIG. 5.

Figure 6:
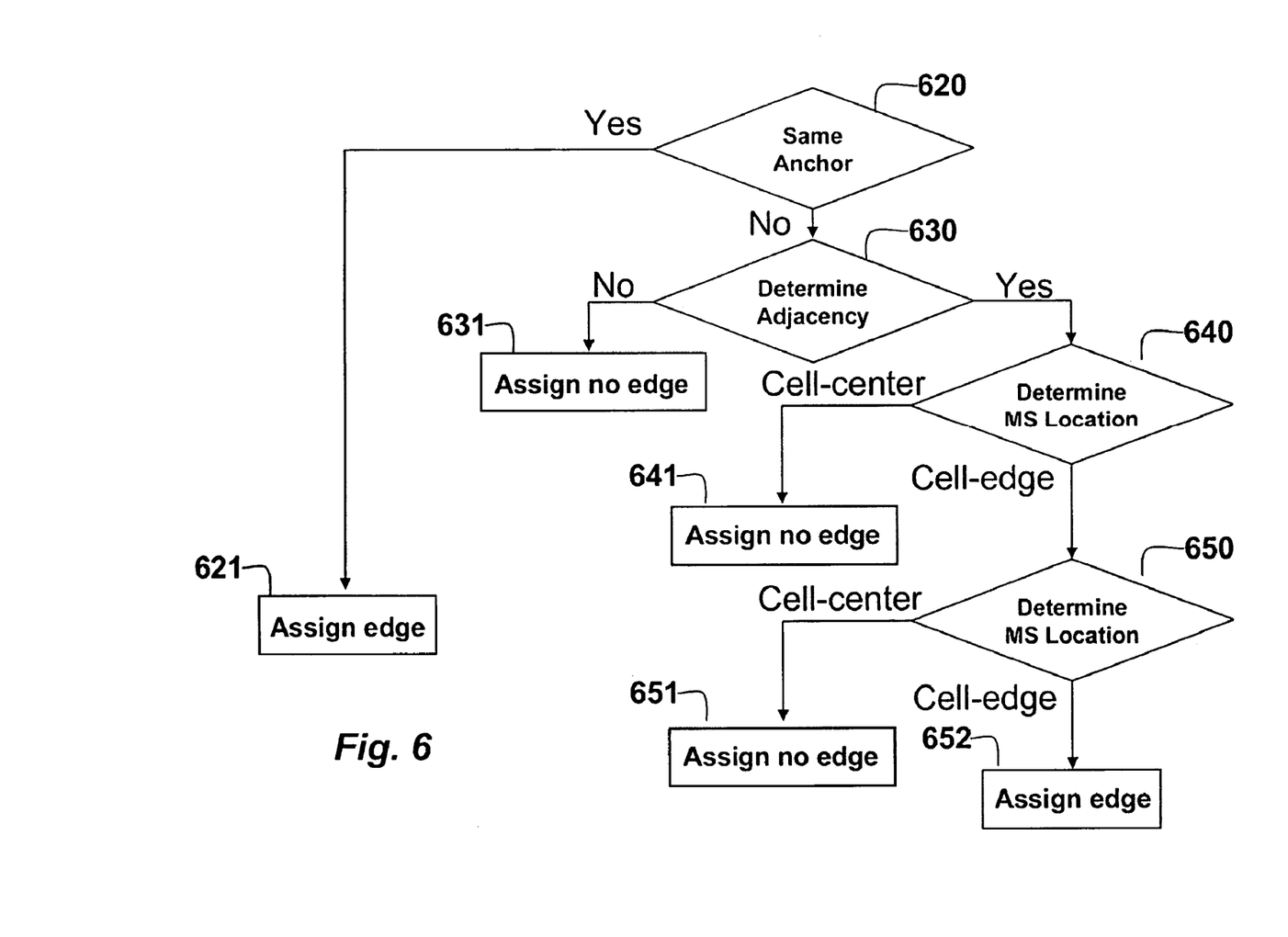

FIG. 6 shows the method to determine the edge between two nodes a and b, for FFR-B.

First, the anchor BSs of MS a and MS b are checked 620. If they are the same, the edge decision can be made directly, i.e., nodes a and b are connected by an edge 621, as described above with respect to satisfying the subchannel allocation constraints.

If they are not the same, then further processing is needed. Specifically, anchor BS of MS a is checked 630 whether it is adjacent to anchor BS of MS b. If it is not, then nodes a and b are not connected by an edge 631, i.e., there are no subchannel allocation constraints to be satisfied. If the BSs are adjacent, then MS a is examined 640 to determine if it is at the cell center or at the cell edge. If MS a is at the cell center, then assign no edge 641 between nodes a and b, i.e., there are no subchannel allocation constraints to be satisfied. If MS a is at the cell edge, then MS b is further examined 650 to determine if it is at the cell center or at the cell edge. If MS b is at the cell center, then assign no edge 651, otherwise, assign edge 652 between nodes a and b, i.e., there are subchannel allocation constraints that may need to be satisfied.

Figure 7:
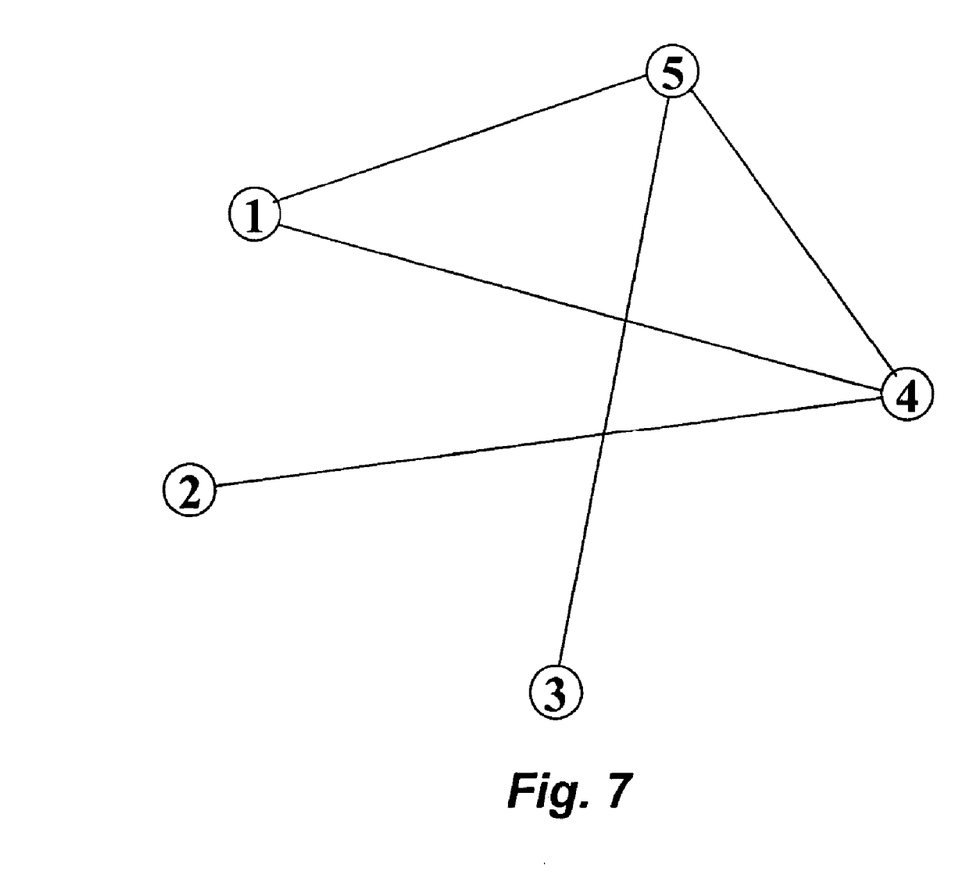

The resulting graph is shown in FIG. 7.

Graph Coloring

The second step 120 of the graph-based method is to color the nodes in the graph. The well known Brelaz's procedure can be used to color the nodes of a graph, see Brelaz, D. "New Methods to Color the Vertices of a Graph." Comm. ACM 22, pp. 251-256, 1979. The Brelaz's procedure colors all graphs successfully provided that the graph is colorable.

Figure 8:
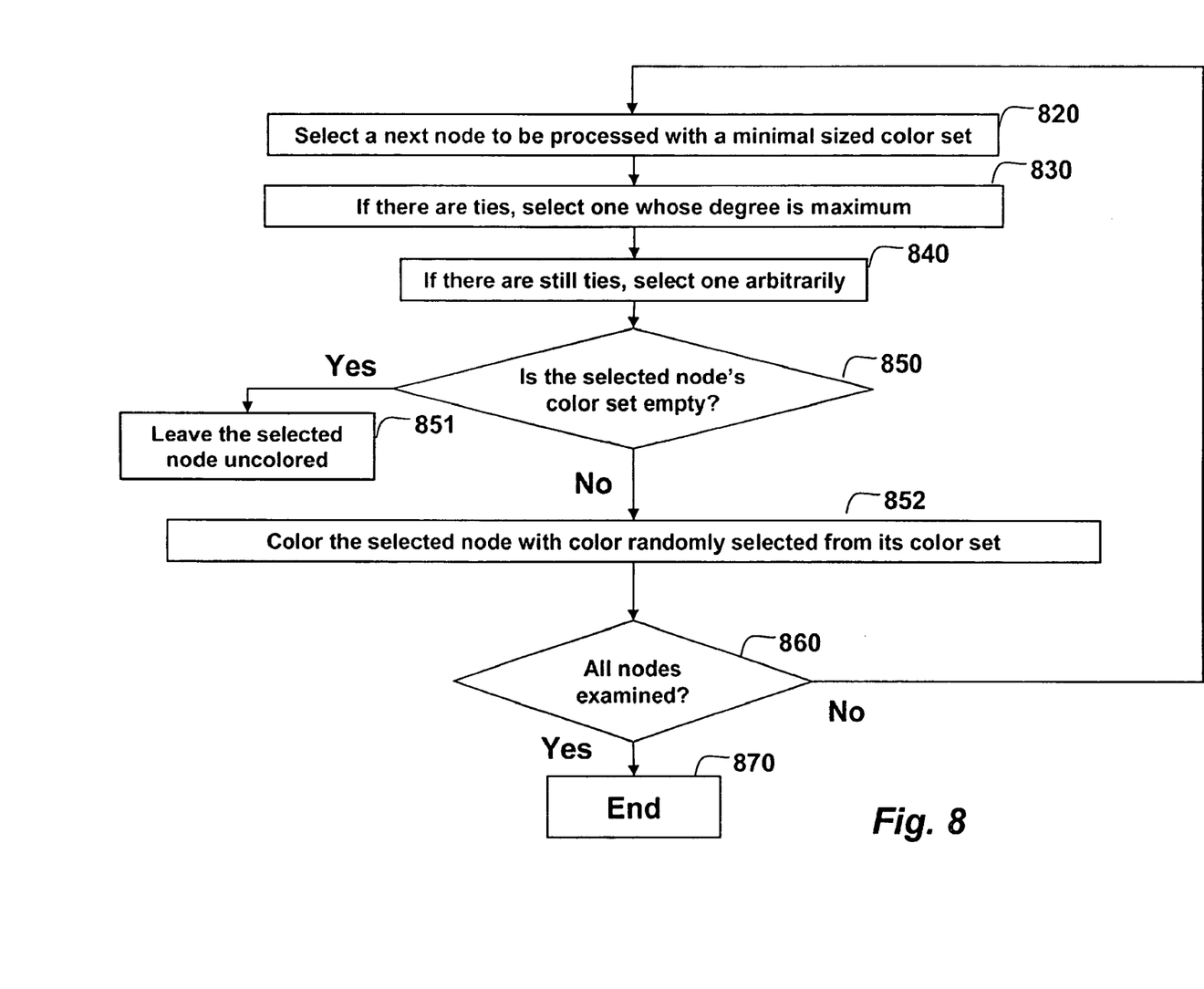
FIG. 8 is a flow chair of a method for coloring a graph according to embodiments of the invention.

Because the allocatable frequency spectrum is a fixed and predetermined resource, the number of colors (subchannels) may be insufficient to meet the need of all mobile stations in the network, i.e., there may be some nodes that are not colorable. If a node is not colorable, then it means the corresponding mobile station can possibly interfere, and may not be operable. In other cases, the number of colors (subchannels) may be greater than needed, which, without properly balancing the use of colors, can waste the frequency spectrum and cause unnecessary interference. Thus, we modify Brelaz's procedure as shown in FIG. 8 to accommodate these cases.

We select 820 a next node to be processed. Each node is associated with a set of colors. The colors and sizes of the sets can be different for different nodes. The set includes the colors that may be used to color the node while satisfying the subchannel allocation constraints. The size of the color set of the selected node is a minimum. If there are ties in terms of the minimal size, then select 830 the node with a maximal degree 830. The degree of a node is the number of edges connected to the node. If there are still ties, then select one of the nodes arbitrarily 840.

We determine 850 if the color set of the selected node is empty. If the set is empty, then we leave the selected node uncolored 851. Otherwise, color 852 the selected node with a color randomly selected from its color set. The random selection can balance the use of colors when the number of colors is larger than needed. We determine 860 if all nodes have been processed, i.e., either colored or left uncolored. If all nodes have been processed, the coloring ends 870. Otherwise, repeat the procedure at step 820 for the next node to be processed.

It is to be understood that various other adaptations and modifications can be made within the spirit and scope of the invention. Therefore, it is the object of the appended claims to cover all such variations and modifications as come within the true spirit and scope of the invention.

We claim:

1. A method for allocating frequency subchannels in an orthogonal frequency-division multiple access (OFDMA) network including a set of base stations and a set of mobile stations for each base station, comprising the steps of:
    constructing a graph of nodes and edges, in which the nodes represent the mobile stations in the network, and the edges connecting the nodes represent subchannel allocation constraints to be satisfied for the mobile stations represented by the nodes; and
    coloring the nodes with colors selected from a set of colors such that subchannel allocations and colors of a pair of nodes connected by one of the edges are different, wherein the steps are performed in the base station.

2. The method of claim 1, wherein the pair of nodes are connected by one of the edges if the mobile stations represented by the nodes are served by the same base station.

3. The method of claim 1, wherein the edges take into account a specific fractional frequency reuse (FFR) scheme and a topology of the network.

4. The method of claim 3, wherein a first FFR allocates different subchannels to the mobile stations in edge regions of adjacent cells, in center and edge regions of adjacent cells, and permits overlapping use of the subchannels for other mobile stations.

5. The method of claim 3, wherein a second FFR allocates different subchannels to the mobile stations in edge regions of adjacent cells, and permits overlapping use of the subchannels for other mobile stations.

6. The method of claim 1, wherein a size of the set of colors is predetermined.

7. The method of claim 1, wherein the coloring further comprises the steps of:
    selecting a next node to be processed, wherein a size in the set of colors is a minimum, and if there is a tie, selecting the next node as having a maximal degree, and is there is another tie then selecting one of the nodes arbitrarily;
    leaving the node uncolored if the set is empty; and
    otherwise coloring the node with one of the colors selected from the set randomly, and repeating beginning at the selecting step until all nodes have been processed.

* * * * *